United States Patent
Yasuhara et al.

(10) Patent No.: US 9,701,198 B2
(45) Date of Patent: Jul. 11, 2017

(54) METER DISPLAY DEVICE FOR VEHICLE

(71) Applicant: KAWASAKI JUKOGYO KABUSHIKI KAISHA, Hyogo (JP)

(72) Inventors: Hidefumi Yasuhara, Kakogawa (JP); Shigeru Yamashita, Akashi (JP); Takashi Miyauchi, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 99 days.

(21) Appl. No.: 14/070,806

(22) Filed: Nov. 4, 2013

(65) Prior Publication Data

US 2014/0125475 A1   May 8, 2014

(30) Foreign Application Priority Data

Nov. 6, 2012  (JP) ................... 2012-244409

(51) Int. Cl.
*B60K 35/00* (2006.01)

(52) U.S. Cl.
CPC ........... *B60K 35/00* (2013.01); *B60Y 2200/12* (2013.01)

(58) Field of Classification Search
CPC ....... B60K 35/00; B60K 37/02; G06F 3/0482; G06F 3/0485; G06F 3/04855; G06F 3/04883; G06F 2203/04806; G06F 2203/04808
USPC ...................................................... 340/441
See application file for complete search history.

(56) References Cited

U.S. PATENT DOCUMENTS

| | | | | |
|---|---|---|---|---|
| 6,667,726 | B1* | 12/2003 | Damiani | B60K 35/00 340/461 |
| 7,380,215 | B2* | 5/2008 | Nystrom | B60K 35/00 345/204 |
| 2001/0028176 | A1* | 10/2001 | Suzuki | B60K 37/02 296/70 |
| 2005/0273216 | A1 | 12/2005 | Imai et al. | |
| 2006/0072331 | A1* | 4/2006 | Yamaguchi | B62J 35/00 362/473 |
| 2007/0046453 | A1 | 3/2007 | Okabe et al. | |
| 2008/0309820 | A1* | 12/2008 | Kostepen | B60R 11/0235 348/563 |

(Continued)

FOREIGN PATENT DOCUMENTS

| | | |
|---|---|---|
| JP | 2012-13452 | 1/2012 |
| JP | 2012-45983 | 3/2012 |

OTHER PUBLICATIONS

Extended European Search Report issued Jun. 29, 2015 in corresponding European Application No. 13191569.6.

*Primary Examiner* — Laura Nguyen
(74) *Attorney, Agent, or Firm* — Wenderoth, Lind & Ponack, L.L.P.

(57) ABSTRACT

A meter display device for a vehicle includes a rotation number display region which displays a rotation number of a drive source, wherein the rotation number display region is divided into a plurality of partial display regions having different rotation number ranges displayed, wherein the partial display regions have display operation elements which are changed between minimum and maximum values of the respective corresponding rotation number ranges with an increase and a decrease of the rotation number, wherein the partial display regions are separated from each other.

6 Claims, 7 Drawing Sheets

(56) References Cited

U.S. PATENT DOCUMENTS

| | | | | |
|---|---|---|---|---|
| 2009/0096597 A1* | 4/2009 | Avery, Jr. | ............. | G08G 1/0962 340/435 |
| 2010/0201645 A1* | 8/2010 | Asami | ................ | G06F 3/04842 345/173 |
| 2010/0270135 A1* | 10/2010 | Murasawa | ............. | B60K 20/06 200/61.88 |
| 2011/0265040 A1* | 10/2011 | Shin | ...................... | G06F 3/0481 715/830 |
| 2013/0088447 A1* | 4/2013 | Becze | .................. | G06F 3/1438 345/173 |

\* cited by examiner

METER DISPLAY DEVICE FOR VEHICLE

BACKGROUND OF THE INVENTION

1. Field of the Invention

The present invention relates to a meter display device provided in various vehicles, such as a motorcycle, a four-wheel vehicle, and a small watercraft.

2. Description of the Prior Art

FIG. 7 shows an example of a conventional meter display device for motorcycle (Japanese Patent Application (JP-A) No. 2012-45983). A display surface displays a vehicle driving speed, a driving distance, a remaining fuel quantity, a blinker operation, and an engine rotation number (i.e., rotation speed). To display the engine rotation number, an engine rotation number display region 102 is provided. The engine rotation number display region 102 includes a large number of display segments which are provided in proximity in a line arrangement from a minimum rotation number value display segment 102a at the left end thereof to a maximum rotation number value display segment 102b at the right end thereof. In the engine rotation number display region 102, the number of display segments in a luminous state is increased from or decreased to the minimum rotation number value side according to the change in engine rotation number. With this, the engine rotation number is checked.

The engine rotation number is display information which is frequently visually checked together with the driving speed by the rider during driving. Besides, the engine rotation number is required to be instantaneously visually checked during driving.

However, in the conventional art in which the display segments are provided in proximity in a line arrangement from the minimum rotation number value display segment 102a to the maximum rotation number value display segment 102b, the engine rotation number display region 102 is long in the left-right direction to make the meter display device larger. To reduce the left-right width of the meter display device, for instance, the left-right display width of each display segment is decreased to shorten the length of the engine rotation number display region 102. This can lower the visibility of the engine rotation number value.

An object of the present invention is to provide a meter display device for vehicle which can ensure the visibility of engine rotation number display during driving and make the meter display device compact.

SUMMARY OF THE INVENTION

To achieve the above object, the present invention provides a meter display device for vehicle including a rotation number display region which displays a rotation number of the output shaft of a drive source, wherein the rotation number display region is divided into a plurality of partial display regions having different rotation number ranges displayed, wherein the partial display regions have display operation elements which are changed between the minimum value and the maximum value of the respective corresponding partial rotation number ranges with the increase and decrease of the rotation number, wherein the partial display regions are isolated from each other on a meter display surface.

In addition to the configuration, the present invention may preferably have the following configurations.

(a) The vehicle is a straddle type vehicle, the meter display device being arranged at the center of the straddle type vehicle in the vehicle width direction.

(b) The partial display regions are a first partial display region which displays the partial rotation number range on the low speed side including an idle rotation number value and a second partial display region which displays the partial rotation number range on the high speed side larger than the idle rotation number value.

(c) When the first and second partial display regions are provided, the second partial display region on the high speed side is larger than the first partial display region on the low speed side.

(d) When the first and second partial display regions are provided, the second partial display region extends from one of the left and right ends of the meter display surface to the other end thereof.

(e) When the first and second partial display regions are provided, the first partial display region and the second partial display region are isolated from each other on the upper and lower sides. In this case, preferably, the second partial display region is arranged in the upper half of the meter display surface, and the first partial display region is arranged in the lower half of the meter display surface.

(f) When the first and second partial display regions are provided, the second partial display region includes a plurality of light emitting elements which each make each display operation element luminous, the first partial display region includes a mask element which switches the transmission and non-transmission states of backlight for each display operation element, and the mask element is shared between the rotation number and other information.

(1) According to the present invention, the partial display regions of the rotation number display region can be separated from each other in any position in the meter display surface and be arranged in their own states (arranging directions). The rotation number display region can thus be arranged by effectively using the meter display surface although an area of the meter display surface is limited. Therefore, the visibility of the rotation number value can be ensured, and the whole meter display surface can be compact.

(2) A straddle type vehicle, such as a motorcycle, has a smaller meter display region than an automobile. However, according to configuration (a), in such a straddle type vehicle, such as a motorcycle, the meter display device is arranged at the center in the vehicle width direction. Therefore, the visibility of the rider can be ensured, and the meter display device can be held compact.

(3) According to configuration (b), among a plurality of partial display regions, the second partial display region on the high speed side which is frequently checked during driving is separated from the other partial display region. Therefore, the rotation number can be easily checked during driving.

(4) According to configuration (c), the second partial display region on the high speed side which has a high checking importance degree (frequency) during driving is larger than the first partial display region. Therefore, the rotation number information of the high rotation number range which is display-changed during driving can be easily and instantaneously checked.

(5) According to configuration (d), the second partial display region which has a high checking importance degree extends from one of the left and right ends of the meter display surface to the other end thereof. Therefore, the meter display device can be held compact, and the length of the second partial display region can be long to be easily checked.

(6) According to configuration (e), the first partial display region and the second partial display region are separated in the upper side and the lower side. Therefore, the first partial display region and the second partial display region can be easily separated from each other. In particular, the second partial display region on the high speed side is arranged in the upper half of the meter display surface. The visibility of the rider during driving can thus be further improved.

(7) According to configuration (f), the second partial display region includes the light emitting elements (LEDs) for the respective display segments, and the first partial display region includes the mask element, such as a liquid crystal display, which is switched to change the displayed contents thereof and is shared between the rotation number and other information. Therefore, the visibility of the rotation number during driving can be further improved.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

First Embodiment

Figure 1:
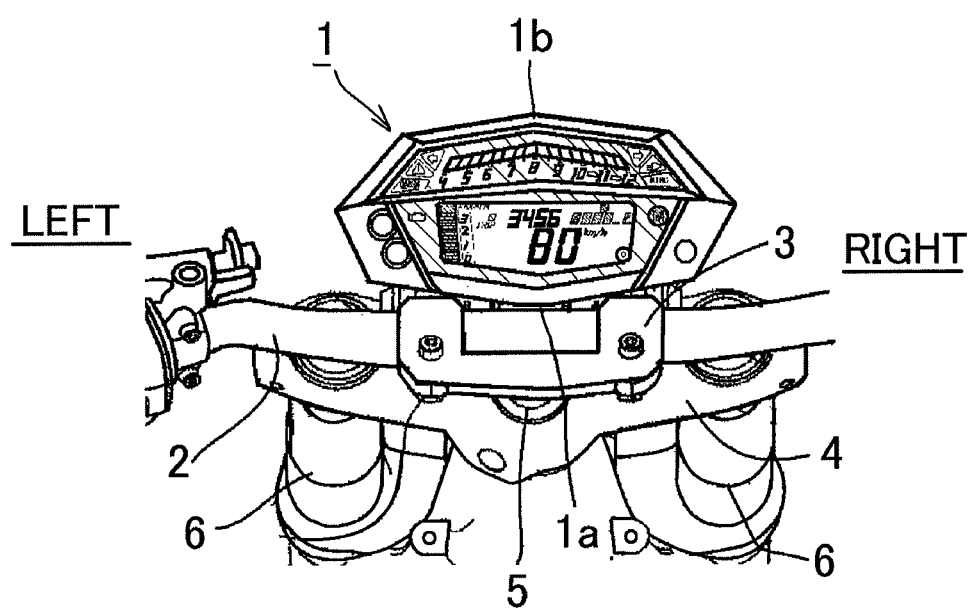
FIG. 1 is a perspective view of an operating portion of a motorcycle including a meter display device according to a first embodiment of the present invention seen from the rear and the top.
Figure 2:
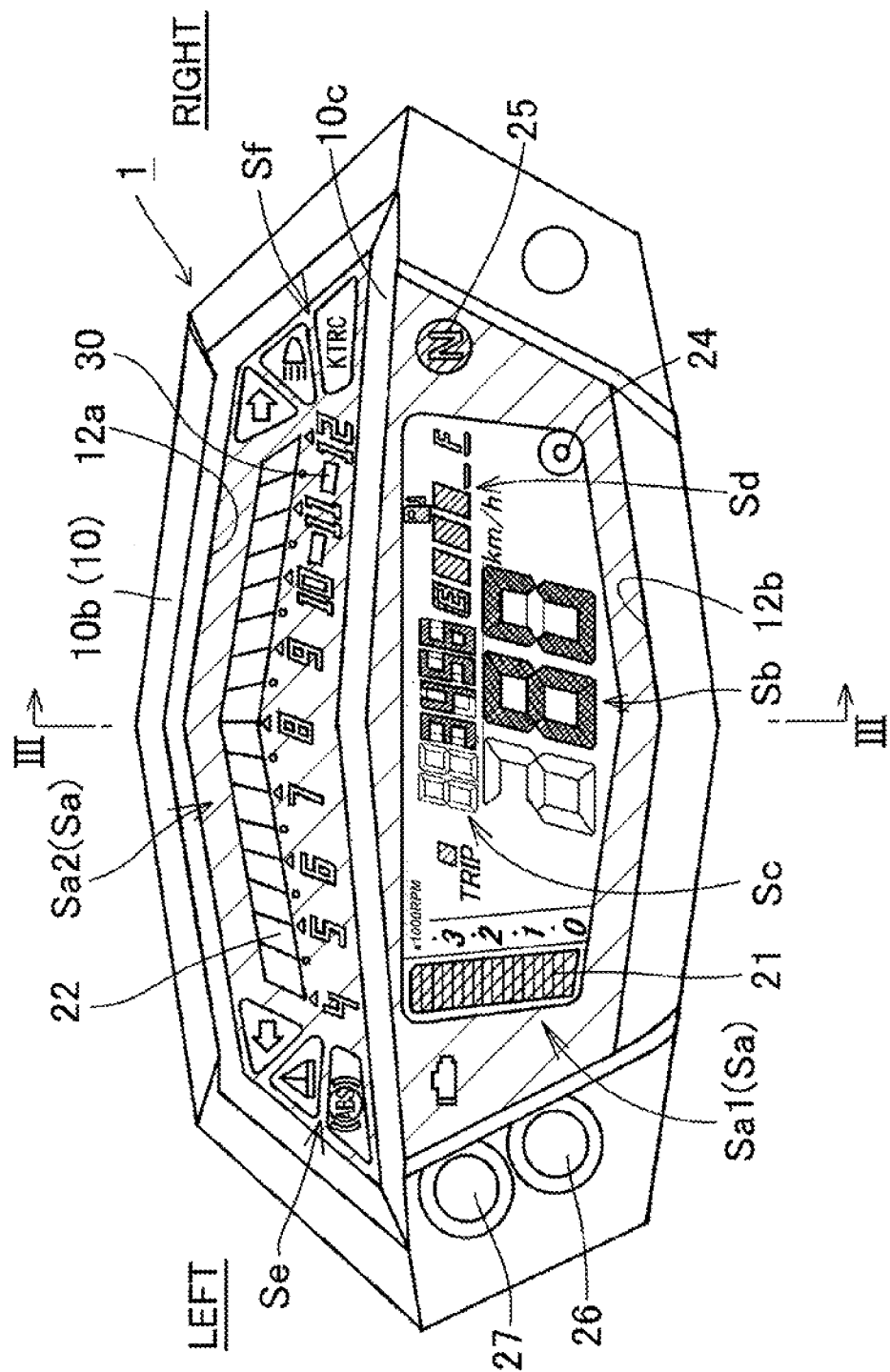
FIG. 2 is a rear view of the meter display device of FIG. 1 seen from the rear and the top.
Figure 3:
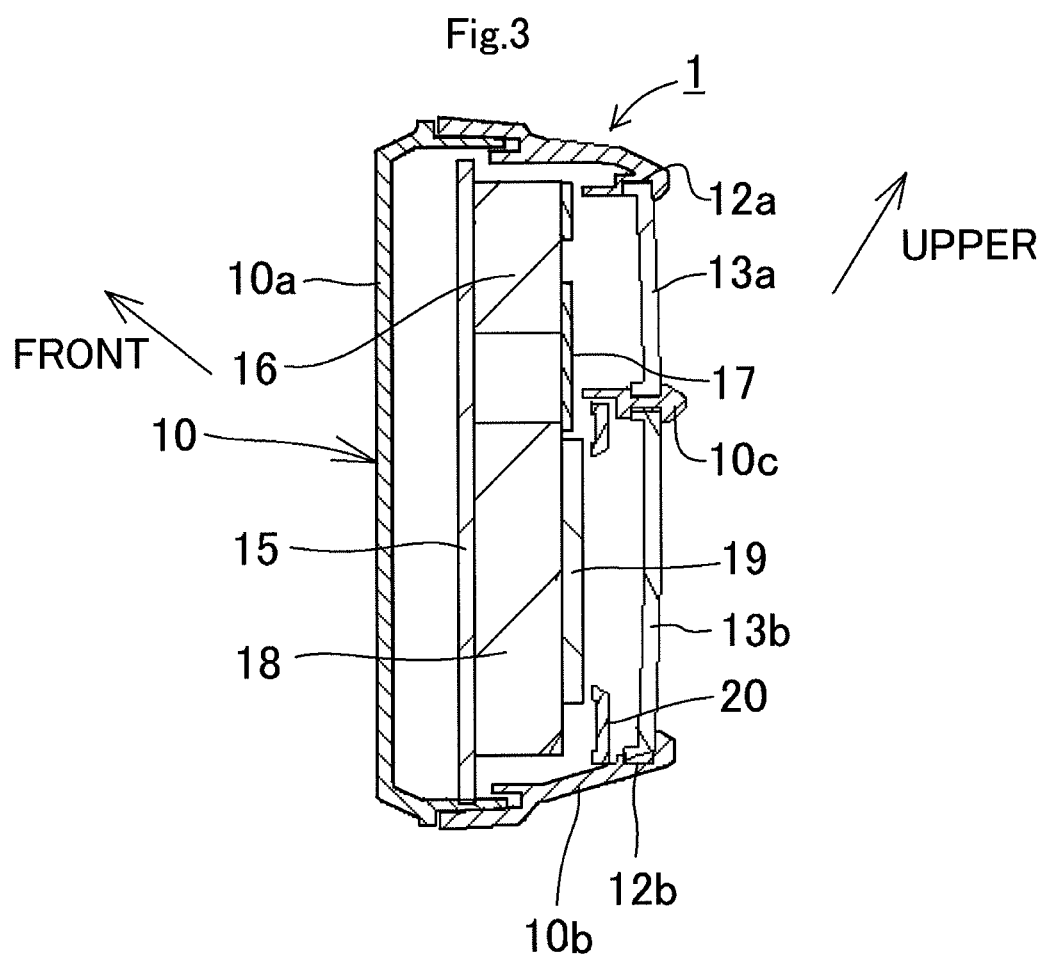
FIG. 3 is a cross-sectional view taken along line III-III of FIG. 2.

FIGS. 1 to 3 show a meter display device for vehicle according to a first embodiment of the present invention. The meter display device is provided in a motorcycle equipped with an internal combustion engine or an electrically-operated motor for driving as a drive source. For convenience in description, the left-right direction seen from the rider on the motorcycle is the left-right direction of the motorcycle and the meter display device.

FIG. 1 is a perspective view of an operating portion of the motorcycle seen from the rear and the top. A meter display device 1 is arranged in front of a handlebar 2 so as to be located at the substantially center of the left-right width of the vehicle. By a mounting bracket 3, the meter display device 1 is mounted to an upper bracket for steering 4 together with the handlebar 2. The upper bracket 4 has left and right ends connected to the upper ends of left and right front forks 6. By steering the handlebar 2 in the left-right direction, the meter display device 1 is moved in the left-right direction (angle shifted) about a steering shaft 5 together with the handlebar 2 and the upper bracket 4.

The meter display device 1 is inclined forward and upward relative to the horizontal plane. That is, the meter display device 1 is inclined so that a device distal end (front upper end) 1b on the opposite side of the handlebar side is located forward and upward relative to a device base end (rear lower end) 1a on the handlebar side. To simplify the description, the distal end side (front upper end side) of the inclined meter display device 1 is simply referred to as the "upper side" of the meter display device, and the base end side (rear lower end side) of the inclined meter display device is simply referred to as the "lower side" of the meter display device.

FIG. 3 is an enlarged cross-sectional view taken along line III-III of FIG. 2. A meter case 10 is constituted by coupling a front case member 10a and a rear case member 10b. A rear surface of the rear case member 10b has an opening. The opening is divided into an upper opening 12a and a lower opening 12b by a partition 10c extending in the left-right direction. Transparent plates for protection 13a and 13b are fitted into the openings 12a and 12b, respectively.

A substrate 15 is arranged in the meter case 10. A light emitting diode type display mechanism 16 and a display plate 17 therefor are provided in the region corresponding to the upper opening 12a of the substrate 15. The display mechanism 16 displays an engine rotation number (i.e. an engine rotation speed). A liquid crystal display (an example of a mask element) 18, a lens for liquid crystal 19, and a cover plate 20 are provided in the region corresponding to the lower opening 12b. The liquid crystal display 18 displays a vehicle speed and a driving distance. The substrate 15 is electrically connected to a display control portion. As the display control portion, an ECU (engine control unit) mounted on the motorcycle is used.

FIG. 2 is a rear view of the meter display device 1. The meter display device 1 has a meter display surface which displays various numerical values. The partition 10c divides the meter display surface into an upper display surface in the region corresponding to the upper opening 12a and a lower display surface in the region corresponding to the lower opening 12b.

[The Configuration of a Rotation Number Display Region]

A rotation number display region Sa which displays the engine rotation number is divided into a first partial display region Sa1 which displays the partial rotation number range on the low speed side and a second partial display region Sa2 which displays the partial rotation number range on the high speed side. The first partial display region Sa1 on the low speed side is arranged in the lower display surface, and displays the change in rotation number in the low rotation number range from a rotation number of 0 to a predetermined rotation number, specifically, 4000 rpm. The second partial display region Sa2 on the high speed side is arranged in the upper display surface, and displays the change in rotation number in the high rotation number range from 4000 rpm as the predetermined rotation number to 12000 rpm.

A liquid crystal screen is formed in the lower display surface, and has a substantially rectangular shape which is long in the left-right direction. The first partial display region Sa1 on the low speed side of rotation number display region Sa is provided at the left end of the liquid crystal screen. A plurality of display segments 21 are provided in proximity in a line arrangement in the first partial display region Sa1 to be stacked in the up-down direction. The display segments 21 have a rectangular shape which is elongate in the left-right direction. The display segments 21 each have an up-down width corresponding to a first rotation number width which is previously set to 250 rpm. On the right side of the display segments 21, rotation number numerical values "0", "1", "2", and "3" are displayed as codes. Each of the numerical values indicates ×1000 rpm. The numerical values "1", "2", and "3" are provided in the corresponding upward positions from "0" at the lower end of the first partial display region Sa1 in that order, respectively.

In the embodiment, the non-transmission state (black state) of the liquid crystal screen refers to the display operated state of the display segments 21 and the transmission state (e.g., white) of the liquid crystal screen refers to the non-display operated state of the display segments 21. Therefore, with the increase of the rotation number, the partial rotation number range on the low speed side is changed from "white" to "black" from the display segment 21 at the bottom.

Contrary to the configuration, the non-transmission state (black state) of the liquid crystal screen may be the non-display operated state of the display segments 21, and the transmission state (e.g., white) of the liquid crystal screen may be the display operated state of the display segments 21. In this case, with the increase of the rotation number, the partial rotation number range on the low speed side is changed from "black" to "white" from the display segment 21 at the bottom.

In addition to the first partial display region Sa1 on the low speed side, a driving speed display region Sb is set to the center of the left-right width of the liquid crystal screen in the lower display surface, and occupies a large area. Further, above the driving speed display region Sb, a driving distance (TRIP) display region Sc and a remaining fuel display region Sd are set from the left in that order. The driving speed display region Sb is larger than the driving distance display region Sc and the remaining fuel display region Sd. The information of the display regions Sb, Sc, and Sd is displayed on the liquid crystal display 18 (FIG. 3) which is shared between the first partial display region Sa1 on the low speed side and the display regions Sb, Sc, and Sd. A warning LED lamp 24 is arranged at the lower-right end of the liquid crystal screen. A neutral lamp 25 is arranged on the right side of the liquid crystal screen, and is luminous by a LED.

A reset button 26 and a numerical value set button 27 are arranged at the left end in the lower half of the rear surface of the meter case 10.

Sub-display regions Se and Sf for various indicators are set to the left and right ends of the upper display surface. The second partial display region Sa2 is formed between the left sub-display region Se and the right sub-display region Sf to be long in the left-right direction. The second partial display region Sa2 displays the partial rotation number range on the high speed side. In this embodiment, the second partial display region Sa2 has a gently inverted V-shape in which the center of the left-right width is projected slightly upward. The states of a left blinker and an ABS are luminously displayed in the left sub-display region Se. A right blinker, a high beam, and traction control are luminously displayed in the right sub-display region Sf. All of these are luminous by using LED lamps.

A plurality of display segments 22 are provided in proximity in a line arrangement in the left-right direction in the second partial display region Sa2 for the partial rotation number range on the high speed side. The display segments 22 have luminous regions in substantially parallelogrammatic shape. The display segments 22 each have a left-right width corresponding to a second rotation number width which is previously set to 500 rpm. The rotation number numerical values "4", "5", . . . , "11", and "12" are displayed as codes below the display segments 22. Each of the numerical values indicates ×1000 rpm. The numerical values "4", "5", . . . , "11", and "12" are provided in the corresponding rightward positions from the left end of the second partial display region Sa2 in that order. In particular, red zones 30 for warning excessive speed are provided between the numerical values "10" and "11" and between the numerical values "11" and "12".

One display segment 21 in the first partial display region Sa1 displays a rotation number width of 250 rpm, and one display segment 22 in the second partial display region Sa2 displays a rotation number width of 500 rpm which is twice the rotation number width of one display segment 21 in the first partial display region Sa1. Besides, in the display segment widths of the first partial display region Sa1 and the second partial display region Sa2 in the rotation number increasing/decreasing direction corresponding to the same rotation number width, the segment width (the left-right length) of the second partial display region Sa2 is larger than the segment width (the up-down length) of the first partial display region Sa1. Specifically, the segment width of the second partial display region Sa2 is about 1.3 to 1.5 times larger than the segment width of the first partial display region Sa1.

This will be specifically described. L2 is the left-right length of one display segment 22 in the second partial display region Sa2 corresponding to the rotation number width of 500 rpm. L1 is the up-down length of one display segment 21 in the first partial display region Sa1 corresponding to the rotation number width of 250 rpm. Even when the up-down length of two display segments 21 in the first partial display region Sa1 are totaled (2L1), left-right length L2 of one display segment 22 in the second partial display region Sa2 is larger than total numerical value 2L1. Specifically, as described above, left-right width L2 of one display segment 22 in the second partial display region Sa2 is about 1.3 to 1.5 times longer than total numerical value 2L1.

Each of the display segments 22 in the second partial display region Sa2 may be luminous by using the light emitting diode display mechanism 16 in FIG. 3. The luminous color is typically "white", but can be favorite colors, such as "green" and "blue".

[Operation]

Since the engine rotation number is 0 at the stop of the engine, all the display segments 21 in the first partial display region Sa1 are in the non-display operated state (transmission state, white). All the display segments 22 in the second partial display region Sa2 are in the non-luminous state.

When the engine is driven to an idle rotation number, e.g., about 1500 rpm, the first to sixth display segments 21 from the bottom of the first partial display region Sa1 are switched or changed to the display operated state (black).

When the engine rotation number is increased to start driving, the number of display segments 21 in the display operated state in the first partial display region Sa1 is increased. In addition, with the start of driving, the numerical value of the driving speed display region Sb is increased according to the vehicle speed. The numerical value of the driving distance display region Sc is also increased.

When the engine rotation number exceeds the predetermined rotation number of 4000 rpm, all the display segments 21 in the first partial display region Sa1 are switched or changed to the display operated state (black). With this, the second partial display region Sa2 sequentially becomes luminous from the display segment 22 at the left end to the display segment 22 at the right end.

[Effects of the Embodiment]

(1) According to the first embodiment, in FIG. 2, the rotation number display region Sa is divided into the first partial display region Sa1 which displays the partial rotation number range on the low speed side and the second partial display region Sa2 which displays the partial rotation number range on the high speed side. The partial display regions Sa1 and Sa2 are separated from each other on the upper and lower display surfaces. The partial display regions Sa1 and Sa2 can be arranged in their own states in such a manner that the first partial display region Sa1 may extend vertically (in the up-down direction) and the second partial display region Sa2 may extend horizontally (in the left-right direction). The rotation number display region Sa can thus be arranged by effectively using the meter display surface whose area is limited. Therefore, the visibility of the rotation number value can be ensured, and the meter display surface can be compact.

(2) As shown in FIG. 1, the motorcycle which is a straddle type vehicle has a smaller meter display region than an automobile. However, the meter display device 1 is arranged at the center in the vehicle width direction. Therefore, the visibility of the rider can be ensured, and the meter display device can be held compact. In addition, the rotation number display can be easily identified even when the vehicle body is banked at the time of cornering.

(3) The rotation number display region Sa is divided into the first partial display region Sa1 which displays the partial rotation number range on the low speed side including the idle rotation number value (e.g., 1500 rpm) and the second partial display region Sa2 which displays the partial rotation number range on the high speed side larger than the idle rotation number value. Therefore, the second partial display region Sa2 on the high speed side which is frequently checked during driving can be visually checked without being affected by the change in display of the first partial display region Sa1. The rotation number can be easily checked during driving.

(4) The rotation number display region Sa is divided into the first partial display region Sa1 on the low speed side and the second partial display region Sa2 on the high speed side. The second partial display region Sa2 on the high speed side which is frequently checked during driving is larger (wider) than the first partial display region Sa1 on the low speed side. Therefore, the rotation number information of the high rotation number range can be easily and instantaneously checked during driving.

(5) The rotation number display region Sa is divided into the first partial display region Sa1 on the low speed side and the second partial display region Sa2 on the high speed side. The second partial display region Sa2 on the high speed side which is frequently checked during driving extends from one of the left and right ends of the meter display surface to the other end thereof. Therefore, the meter display device 1 can be held compact, and the length of second partial display region Sa2 which is frequently checked can be long in the left-right direction to be easily checked.

(6) The first partial display region Sa1 on the low speed side and the second partial display region Sa2 on the high speed side are divided into the upper and lower display surfaces. Therefore, the first partial display region Sa1 on the low speed side and the second partial display region Sa2 on the high speed side can be easily isolated or separated from each other. In particular, the second partial display region Sa2 on the high speed side which is frequently checked during driving is arranged in the upper display surface. The visibility of the rider can thus be further improved. In addition, the first partial display region Sa1 which is less frequently checked is arranged in the lower display surface. Therefore, the second partial display region Sa2 can be easily visually checked without caring the change in display of the first partial display region Sa1.

(7) The display segments 21 which are luminous by the liquid crystal display 18 are provided in the first partial display region Sa1. In addition, the liquid crystal display 18 is shared between the display segments 21, the vehicle speed display, and the driving distance display. Therefore, the number and size of the arranged components in the meter case 10 can be reduced. On the other hand, the display segments 22 which are luminous by LEDs are provided in the second partial display region Sa2 on the high speed side which is frequently checked during driving. Therefore, the visibility of the rotation number during driving can be further improved. The light emitting amount of the display segments 22 in the second partial display region Sa2 in the display state is larger than the light emitting amount of the display segments 21 in the first partial display region Sa1. The visibility of the second partial display region Sa2 can thus be improved.

(8) In the display segment widths, the second rotation number width (500 rpm) of one display segment 22 on the high speed side is larger than the first rotation number width (250 rpm) of one display segment 21 on the low speed side. Therefore, the visibility can be improved in all the rotation number ranges.

(9) The first maximum rotation number displayed in the first partial display region Sa1 is higher than the second minimum rotation number (4000 rpm) displayed in the second partial display region Sa2. Therefore, there are no regions in which the rotation number cannot be checked, and the rotation number display can be continuously checked.

(10) The first maximum rotation number on the low speed side and the second minimum rotation number on the high speed side have the same value. There are no overlapped display ranges, so that the display regions can be effectively used.

(11) The second partial display region Sa2 on the high speed side is arranged at the center of the left-right width of the meter. Therefore, the visibility of the high speed side which is frequently checked can be improved.

Second Embodiment

Figure 4:
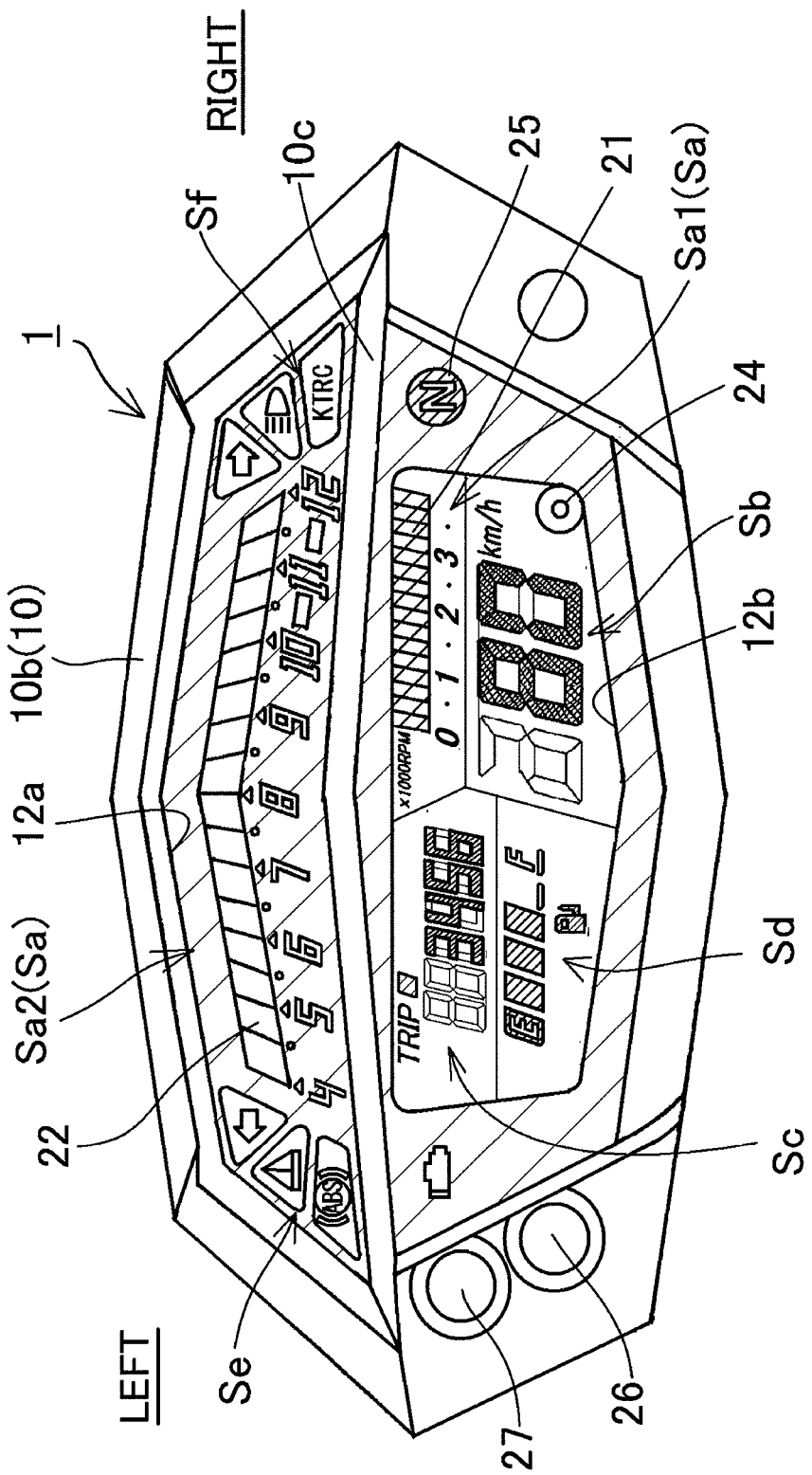
FIG. 4 is a rear view of the meter display device according to a second embodiment of the present invention.

FIG. 4 is a rear view showing the display surface of the meter display device 1 according to a second embodiment of the present invention. The same components and portions as the first embodiment are indicated by similar reference numerals.

A configuration which is different from the first embodiment is the layout in the liquid crystal screen in the lower display surface. The driving distance display region Sc and the remaining fuel display region Sd are set to the upper and lower sides in the left half of the liquid crystal screen in the lower display surface. The first partial display region Sa1 on the low speed side of the rotation number display region Sa is set to the upper portion of the right half of the liquid crystal screen in the lower display surface. The driving speed display region Sb is set below the first partial display region Sa1.

In the first partial display region Sa1 on the low speed side, the display segments 21 in strip shape which are elongate in the up-down direction are provided in proximity in a line arrangement in the left-right direction. The left-right width of each of the display segments 21 shows the rotation number width of 250 rpm.

[Effects of the Second Embodiment]

The second embodiment can obtain the same main effects as the first embodiment and the following effects.

(1) The first partial display region Sa1 is formed on one side in the left-right direction of the lower display surface. Therefore, the display of the display region formed on the other side in the left-right direction can be larger.

(2) The first partial display region Sa1 is arranged in the left-right direction. Therefore, the dimension of the first partial display region Sa1 in the direction in which the display segments are arranged in the first partial display region Sa1 can be larger than the first embodiment. In addition, the first partial display region Sa1 is brought close to the driving speed display region Sb. The vehicle speed display and the low rotation number display can thus be easily checked together.

(3) In both of the first partial display region Sa1 and the second partial display region Sa2, as the number of segments displayed on one side in the left-right direction is increased, the rotation number is increased. Therefore, the rotation number increasing direction can be shared between the first partial display region Sa1 and the second partial display region Sa2. The increase of the rotation number can thus be easily intuitionally identified.

Third Embodiment

Figure 5:
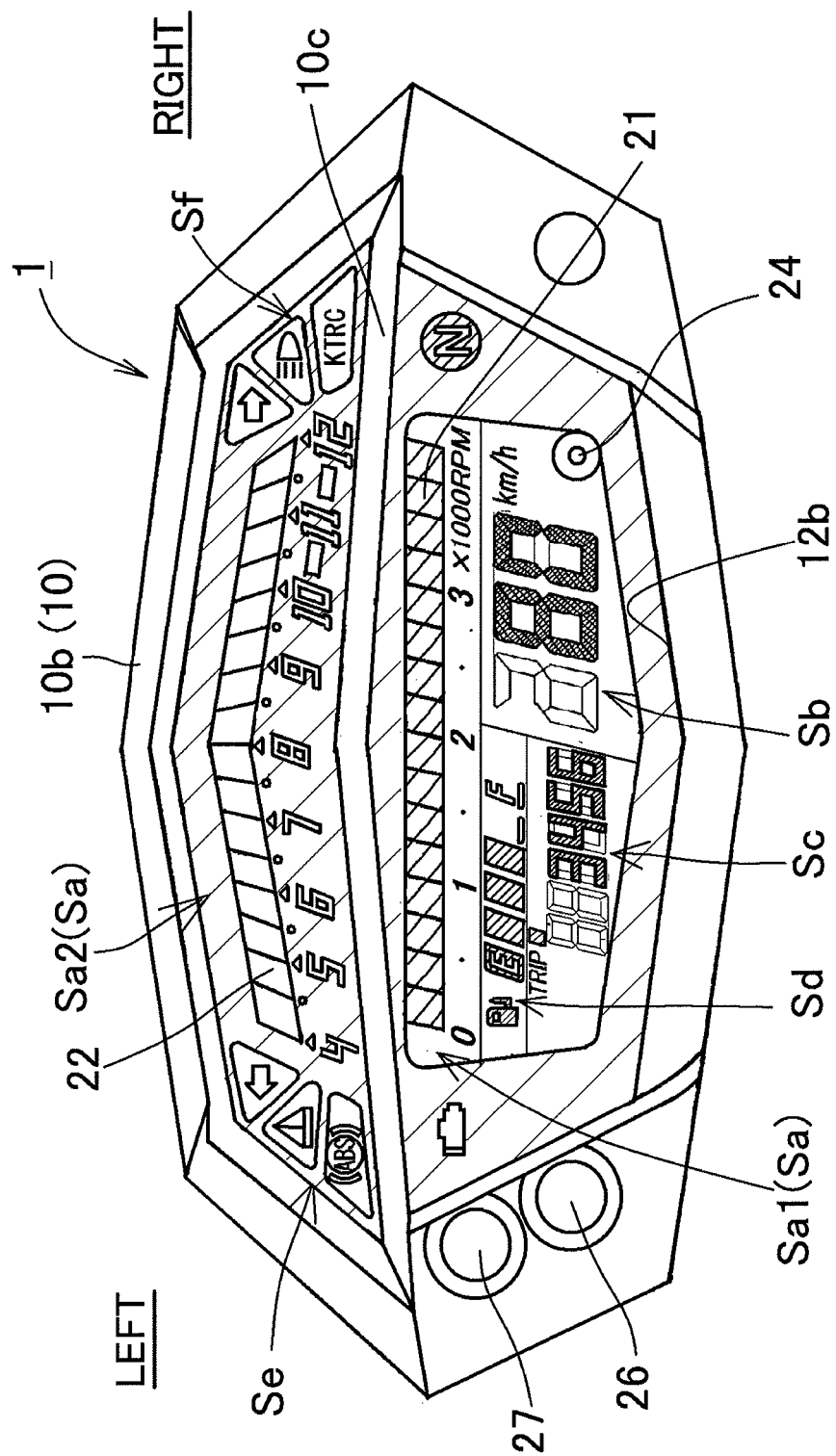
FIG. 5 is a rear view of the meter display device according to a third embodiment of the present invention.

FIG. 5 is a rear view showing the display surface of the meter display device 1 according to a third embodiment of the present invention. The same components and portions as the first embodiment are indicated by similar reference numerals.

A configuration different from the first embodiment is the layout in the liquid crystal screen in the lower display surface. The first partial display region Sa1 on the low speed side is set to the upper end of the liquid crystal screen in the lower display surface to extend over the substantially left-right width of the liquid crystal screen. The driving speed display region Sb is set to the right half below the first partial display region Sa1. The remaining fuel display region Sd and the driving distance display region Sc are set to the left half below the first partial display region Sa1 from the top in that order.

Below the display segments 21 in the first partial display region Sa1, the rotation number numerical values "0", "1", "2", and "3" are provided from the left end in that order.

The size of the first partial display region Sa1 and the size of each of the display segments 21 (the length in the rotation number increasing/decreasing direction) are larger and can be checked more easily than the display segments 21 of the first and second embodiments.

[Effects of the Third Embodiment]

The third embodiment can obtain the same main effects as the second embodiment and the following effects.

(1) The first partial display region Sa1 is formed in the substantially left-right width. Therefore, the visibility of the first partial display region Sa1 can be improved.

Fourth Embodiment

Figure 6:
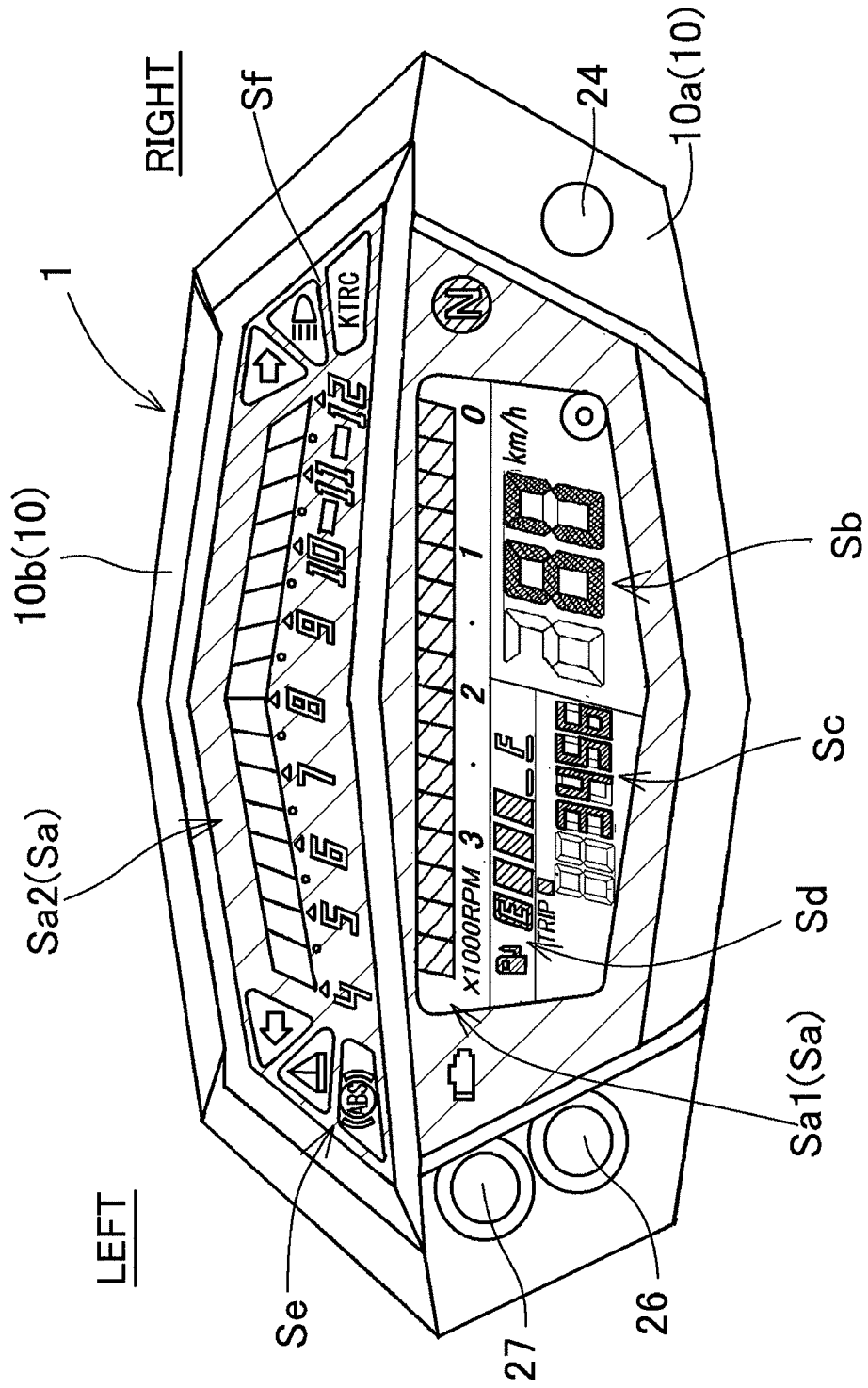
FIG. 6 is a rear view of the meter display device according to a fourth embodiment of the present invention.
Figure 7:
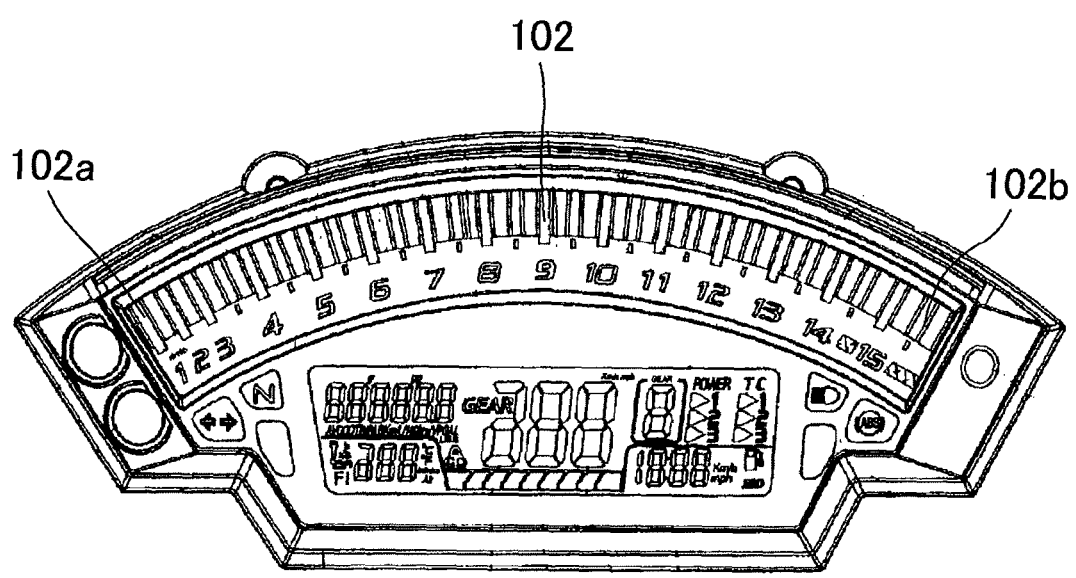
FIG. 7 is a rear view of a conventional example.

FIG. 6 is a modification embodiment of the meter display device in FIG. 5. The second partial display region Sa2 is provided in the upper display surface to extend in the left-right direction. The first partial display region Sa1 is provided in the lower display surface to extend in the left-right direction. However, the arrangement in the left-right direction in the first partial display region Sa1 on the lower side is opposite to the arrangement in FIG. 5. That is, in the embodiment in FIG. 6, the numerical values "0", "1", "2", and "3" are provided in the first partial display region Sa1 on the lower side so that the rotation number is increased from the right end to the left end.

Such a configuration is as follows. The first partial display region Sa1 and the second partial display region Sa2 are isolated or separated from each other on the upper and lower sides. At the time of increasing the rotation number, the number of display segments 21 in the display operated state in the first partial display region Sa1 is increased from the right end to the left end. Then, the second partial display region Sa2 sequentially becomes luminous from the display segment 22 at the left end. Therefore, a continuous operation feeling can be given to the rider.

Other Embodiments (1) As a configuration different from the first embodiment, the driving speed display region having a large area and the driving distance display region can be set at the center of the left-right width of the liquid crystal screen in the lower display surface from the top in that order. In the left portion of the lower display surface, the first partial display region on the low speed side in which the display segments are arranged as in the first embodiment is set. In the right portion of the lower display surface, the remaining fuel display region, an ecological mode, and various emergency indicators are set. Oil alarming display is added to the left sub-display region in the upper display surface. Neutral display is added to the right sub-display region in the upper display surface. Other configurations are the same as the first embodiment. In the different embodiment, a linear display form in which the display segments are arranged in the left-right direction and a clock display form in which the display segments are circularly arranged can be adopted for the remaining fuel display region in the right portion of the lower display surface. In the clock display form, the driving speed display region and the driving distance display region arranged at the center of the lower display surface can be wider in the left-right direction.

(2) As a modification embodiment of the first embodiment in FIG. 2, the first partial display region Sa1 may be arranged in any position on the liquid crystal screen in the lower display surface. For instance, the first partial display region Sa1 may be arranged at the right end.

(3) When the rotation number display region Sa is divided into the first and second partial display regions, the first partial display region Sa1 can be arranged in the upper display surface and the second partial display region Sa2 can be arranged in the lower display surface. In addition, the first partial display region Sa1 may be arranged on one of the left and right sides and the second partial display region Sa2 may be arranged on the other of the left and right sides. Further, the contents of the upper display surface and the contents of the lower display surface may be arranged to be opposite in the up-down direction.

(4) The rotation number display region Sa may be divided into three or more partial display regions. In this case, for instance, the rotation number display region Sa may be divided into three regions for a low rotation number range, an intermediate rotation number range, and a high rotation number range.

(5) In the embodiments, each of the display segments 22 in the second partial display region Sa2 on the high speed side is luminous by the light emitting elements such as LEDs, and the display segments 21 in the first partial display region Sa1 are luminous by using the mask element, such as a liquid crystal display and backlight. However, any display form can be used. For instance, any of the partial display regions can be luminous by using the light emitting elements, such as LEDs, and by the mask element, such as a liquid crystal display.

(6) As each light emitting element which makes each display segment luminous, an organic electroluminescent element or a simple filament bulb may be provided in addition to each LED. By using such a self-emitting element, the visibility can be improved.

(7) The configuration of the first partial display region Sa1 on the low speed side may include an analogue pointer which rotates on its axis as in the conventional art, the analogue pointer sequentially pointing the rotation number values printed therearound like a clock. The second partial display region Sa2 on the high speed side may have bar display. Further, one of the high speed side and the low speed side may have bar display, and the other may have clock display. Alternatively, both the high speed side and the low speed side may have clock display.

(8) The present invention is applicable to a vehicle other than the motorcycle, such as a four-wheel vehicle and a small water craft.

(9) In addition to the vehicle on which a gasoline engine is mounted as a motor, the present invention is applicable to an electrically-operated vehicle on which an electrically-operated motor for driving is mounted. In this case, the rotation number display region displays the rotation number of the drive shaft of the electrically-operated motor as a drive source.

(10) The present invention is preferably used for a vehicle whose gear ratio can be manually changed. That is, by checking the rotation number display of the meter, gear shift can be performed in the appropriate rotation number range.

(11) The present invention is preferably used for a vehicle whose output torque is different according to rotation number. By checking the rotation number of the meter, the output torque can be easily increased and decreased.

(12) The rotation number ranges of the partial display regions can be set so that the section on the maximum value side of the first partial display region on the low speed side and the section on the minimum value side of the second partial display region on the high speed side are overlapped with each other. In the overlapped region, the rotation number can be checked in any of the partial display region on the high side and the partial display region on the low speed side.

In addition, the maximum value of the first partial display region on the low speed side may be smaller than the minimum value of the second partial display region on the high speed side. Therefore, there is no unnecessary rotation number region display, and necessary rotation number region display can be larger (wider).

(13) In the embodiments, the idle rotation number value is included in the rotation number range of the first partial display region on the low speed side. However, the idle rotation number value may be set to the middle position of the first partial display region. According to the configuration, whether the current rotation number is higher or lower than the idle rotation number can be instantaneously checked.

(14) The rotation number range which can obtain the highest output is preferably included in the second partial display region on the high speed side. In addition, the rotation number range in the cruising driving state which is the state after start (e.g., 10 km/h or more) is preferably included.

(15) In the embodiments, the second partial display region on the high speed side and the first partial display region on the low speed side are isolated or separated from each other on the upper display surface and the lower display surface divided by the partition at the center of the up-down width. However, the second partial display region on the high speed side and the first partial display region on the low speed side are not limited to this, and may be isolated or separated from each other on the left and right sides. At least the display segment on the minimum value side of the second partial display region on the high speed side and the display segment on the maximum value side of the first partial display region on the low speed side may be isolated or separated from each other with a gap for one rotation number character displayed or one display segment or more. Of course, the display segments can be arranged in the up-down direction.

(16) In a vehicle in which the rotation number range of the first partial display region on the low speed side is checked more frequently than the second partial display region on the high speed side, the area of the first partial display region on the low speed side and each display segment therein may be larger than the total area of the second partial display region and the area of each display segment therein. Therefore, the information of the first partial display region can be easily checked.

(17) In the embodiments, as the mask element which can switch the transmission and non-transmission states, the liquid crystal display is used. However, a backlight element such as a bulb and other mask elements can be used.

(18) The light emitting amount of the second partial display region on the high speed side per unit area is preferably larger than the light emitting amount of the first partial display region on the low speed side per unit area.

(19) In order that the second partial display region on the high speed side can be easily noticeable, the following configuration can be considered. The second partial display region on the high speed side and the first partial display region on the low speed side are different in size so that the second partial display region on the high speed side is larger than the first partial display region on the low speed side. The display segments in the second partial display region on the high speed side and the display segments in the first partial display region on the low speed side are different in number, size, or unit so that the length in the changing direction of the operation elements changed with the unit rotation number increasing is longer in the second partial display region on the high speed side. Therefore, the display of the change in rotation number in the second partial display region can be easily visually checked.

(20) The predetermined rotation number, the first maximum rotation number, the second minimum rotational speed, the first rotation number width, and the second rotation number width are not limited to the numerical values shown in the embodiments, and can be optionally set.

(21) The present invention is not limited to the configuration of the embodiments, and includes various modification embodiments which can be contemplated within the scope without departing from the contents described in the claims.

What is claimed is:

1. A meter display device for a vehicle comprising:
a meter case having an opening; and
a rotation number display region configured to display a rotation number of an output shaft of a drive source,
wherein the rotation number display region includes:
a first partial display region configured to display a partial rotation number range on a low speed side including an idle rotation number value; and
a second partial display region configured to display another partial rotation number range on a high speed side which is larger than the partial rotation number range on the low speed side of the first partial display region,
wherein the first partial display region and the second partial display region each have display operation elements, each of which is able to change between a display operated state and a non-display operated state, respectively,
wherein the display operation elements of the first partial display region are aligned in a fixed direction on the first partial display region,
wherein the display operation elements of the second partial display region are aligned in another fixed direction on the second partial display region,
wherein a number of the display operation elements in the display operated state is changeable between a minimum value and a maximum value of a respective corresponding one of the rotation number ranges with an increase and a decrease of the rotation number,
wherein the first partial display region and the second partial display region are separated from each other on a meter display surface,
wherein the vehicle is a straddle type vehicle, and the meter display device is arranged at a center of the straddle type vehicle in a vehicle width direction,
wherein the second partial display region on the high speed side is arranged in an upper half portion of the meter display device,
wherein the second partial display region on the high speed side passes a center portion of the meter display device in the vehicle width direction and extends to both sides from the center portion of the meter display device in the vehicle width direction,
wherein the display operation element at a minimum value side of the second partial display region on the high speed side and the display operation element on a maximum value side of the first partial display region on the low speed side are located respectively so that a distance between the display operation element at the minimum value side of the second partial display region on the high speed side and the display operation element on the maximum value side of the first partial display region on the low speed side is longer than at least a length size of one rotation number character displayed or at least a length size of one display operation element,
wherein the display operation element at the minimum value side of the second partial display region on the high speed side is associated with a rotation number that is continuous from a rotation number associated with the display operation element on the maximum value side of the first partial display region on the low speed side,
wherein the display operation elements of the first partial display region are plural display segments, which are formed by dividing the first partial display region into a plurality of pieces in an arranged direction of the display segments of the first partial display region,
wherein the display operation elements of the second partial display region are plural display segments, which are formed by dividing the second partial display region into a plurality of pieces in an arranged direction of the display segments of the second partial display region,
wherein each of the display segments of the first partial display region and each of the display segments of the second partial display region is configured to be luminous and the number of the display segments which is luminous is changeable between the minimum value and the maximum value of the respective corresponding one of the rotation number ranges with the increase and the decrease of the rotation number,
wherein each of the display segments of the second partial display region has a larger area than each of the display segments of the first partial display region, respectively,
wherein the opening of the meter case is divided into an upper opening and a lower opening by a partition extending in a left-right direction, and
wherein the second partial display region is arranged in the upper opening, and the first partial display region is arranged in the lower opening.

2. The meter display device for a vehicle according to claim 1,
wherein the second partial display region includes a plurality of self-emitting light elements, each being configured to make each of the display operation elements luminous, and a number of the self-emitting light elements that emit light being configured to change in accordance with the increase and the decrease of the rotation number,
wherein the first partial display region includes mask elements configured to switch a transmission state and a non-transmission state of a common backlight for each of the display operation elements in accordance with the increase and the decrease of the rotation number, and
wherein the mask elements are shared between the rotation number and other information.

3. The meter display device for a vehicle according to claim 1,
wherein a length of each of the display segments of the second partial display region in the arranged direction of the display segments of the second partial display region is longer than a length of each of the display segments of the first partial display region in the arranged direction of the display segments of the first partial display region.

4. The meter display device for a vehicle according to claim 1,
wherein the arranged direction of the display segments of the first partial display region is parallel to the arranged direction of the display segments of the second partial display region.

5. The meter display device for a vehicle according to claim 1,
wherein a first rotation number width shown by each of the display segments of the first partial display region is smaller than a second rotation number width displayed by each of the display segments of the second partial display region.

6. The meter display device for a vehicle according to claim 1, wherein each of the display segments in the second partial display region has a larger light emitting amount than each of the display segments in the first partial display region.

* * * * *